US011149771B2

(12) United States Patent
He

(10) Patent No.: US 11,149,771 B2
(45) Date of Patent: Oct. 19, 2021

(54) LOCK

(71) Applicant: Unilumin Group Co., Ltd., Guangdong (CN)

(72) Inventor: Jinfeng He, Guangdong (CN)

(73) Assignee: UNILUMIN GROUP CO., LTD., Shenzhen (CN)

( * ) Notice: Subject to any disclaimer, the term of this patent is extended or adjusted under 35 U.S.C. 154(b) by 448 days.

(21) Appl. No.: 16/309,406

(22) PCT Filed: Jan. 12, 2018

(86) PCT No.: PCT/CN2018/072448
§ 371 (c)(1),
(2) Date: Dec. 12, 2018

(87) PCT Pub. No.: WO2019/024447
PCT Pub. Date: Feb. 7, 2019

(65) Prior Publication Data
US 2021/0033123 A1 Feb. 4, 2021

(30) Foreign Application Priority Data
Aug. 4, 2017 (CN) .......................... 201710660752.4

(51) Int. Cl.
*F16B 5/06* (2006.01)
*F16B 5/00* (2006.01)
(Continued)

(52) U.S. Cl.
CPC .......... *F16B 5/0621* (2013.01); *F16B 5/0092* (2013.01); *F16B 12/2036* (2013.01); *G09F 9/3026* (2013.01); *G09F 9/33* (2013.01)

(58) Field of Classification Search
CPC .. F16B 5/0092; F16B 5/0621; F16B 12/2027; F16B 12/2036; Y10S 403/12; G09F 9/3026; G09F 9/33
See application file for complete search history.

(56) References Cited

U.S. PATENT DOCUMENTS

| 4,160,610 A | 7/1979 | Austin-Brown et al. |
| 4,883,383 A | 11/1989 | Challis |
(Continued)

FOREIGN PATENT DOCUMENTS

| CN | 102168702 A | 8/2011 |
| CN | 202189516 U | 4/2012 |
(Continued)

OTHER PUBLICATIONS

Extended European Search Report issued in corresponding European Application No. 18811434.2, dated Feb. 11, 2020, European Patent Office, Munich, Germany.
(Continued)

*Primary Examiner* — Matthew R McMahon
(74) *Attorney, Agent, or Firm* — Hauptman Ham, LLP

(57) ABSTRACT

Provided is a lock, including a locking module and a driving module. The locking module includes a latch mounted on a first main body, an oblique pin ring gear mounted on a second main body and adapted to the latch. A radial thickness of the oblique pin ring gear changes continuously. A first slot is arranged on the latch. The driving module is used for driving the oblique pin ring gear to move in a circular motion, such that on the latch in a closed position the oblique pin ring gear clips to or separates from the first slot. The lock mechanism can realize inward or outward arcuate connection and planar connecting without finishing.

7 Claims, 9 Drawing Sheets

(51) Int. Cl.
    *F16B 12/20*     (2006.01)
    *G09F 9/302*     (2006.01)
    *G09F 9/33*     (2006.01)

(56) References Cited

U.S. PATENT DOCUMENTS

| | | | |
|---|---|---|---|
| 5,785,451 A * | 7/1998 | Horger | F16B 12/2036 403/408.1 |
| 5,788,395 A * | 8/1998 | Grieser | F16B 12/2036 403/231 |
| 5,906,453 A * | 5/1999 | Grieser | F16B 12/2036 403/409.1 |
| 7,774,968 B2 | 8/2010 | Nearman et al. | |
| 8,136,277 B2 * | 3/2012 | Patterson | F21V 21/005 40/541 |
| 9,476,575 B2 * | 10/2016 | Hochman | G09F 9/3026 |

FOREIGN PATENT DOCUMENTS

| | | | | |
|---|---|---|---|---|
| CN | 202939922 U | | 5/2013 | |
| CN | 205376018 U | | 7/2016 | |
| CN | 105976717 A | | 9/2016 | |
| CN | 106013666 A | | 10/2016 | |
| CN | 107387514 A | | 11/2017 | |
| CN | 207111612 U | | 3/2018 | |
| DE | 1000137 B | * | 1/1957 | .......... F16B 12/2036 |
| DE | 202012011684 U1 | * | 3/2014 | ........... F16B 5/0092 |
| JP | 2016-142861 A | | 8/2016 | |

OTHER PUBLICATIONS

International search report dated Apr. 28, 2018 from corresponding application No. PCT/CN2018/072448.

* cited by examiner

LOCK

RELATED APPLICATIONS

The present application is a National Phase of International Application Number PCT/CN2018/072448, filed Jan. 12, 2018, and claims the priority of China Application No. 201710660752.4, filed Aug. 4, 2017.

FIELD OF THE INVENTION

The invention relates to the field of machinery, and more particularly to a lock.

BACKGROUND OF THE INVENTION

The Chinese Patent Application No. 201110102759.7, entitled "lock connection device, LED box and LED display screen", discloses a lock connection device which can be conveniently and efficiently disassembled and assembled, and which is capable of connecting heavier boxes. The lock connection device comprises a hook and a fix pin which are fixed on a first base, a protrusion and a fix hole which are fixed on a second base. A tight locking is achieved by matching the hook with the protrusion, and positioning is achieved by inserting the fix pin into the fix hole. The lock connection device further comprises a tapered adjust screw, by which the lock connection device can also tightly lock and secure two objects in the presence of machining errors in the mold.

The defect of the prior art is that the distance deviation is adjusted by the hook and the adjust screw, and that the adjustment range is limited generally within 1 mm, which is only suitable for adjusting the machining error in the mold. In an arcuate connection, the distance between the inward or outward arcuate boxes varies more than a few millimeters. Therefore, such way of adjusting is not suitable for an arcuate connection. In addition, the existing positioning mechanism is too large, and the positioning pin is easily caught due to the turning moment, resulting in the lack of flexibility in operation.

SUMMARY OF THE INVENTION

The technical problem to be solved by the present invention is to provide a lock capable of adjusting a distance deviation in a wide range and suitable for inward or outward arcuate main bodies having different radians and a planar main body.

In order to solve the above technical problem, the technical solution adopted by the present invention is as follows.

Provided is a lock, comprising a locking module and a driving module, wherein the locking module comprises a latch mounted on a first main body, a oblique pin ring gear mounted on a second main body and adapted to the latch; the radial thickness of the oblique pin ring gear changes continuously; a first slot is arranged on the latch, and wherein the driving module is used for driving the oblique pin ring gear to move in a circular motion, such that on the latch in a closed position the oblique pin ring gear clips to or separates from the first slot.

The invention has the beneficial effects that the oblique pin ring gear inserts into the slot on the latch under the driving of the driving module to lock the first main body and the second main body. Since the radial thickness of the oblique pin ring gear changes continuously, the engagement occurs at a portion where the radial thickness of the oblique pin ring gear is relatively small when the distance deviation between the first main body and the second main body is relatively large; the engagement occurs at a portion where the radial thickness of the oblique pin ring gear is relatively large when the distance deviation between the first main body and the second main body is relatively small. Thus, in the case that the distance deviation between the first main body and the second main body is in a relatively wide range, the lock mechanism is able to secure two connecting plates well. The lock mechanism can realize inward or outward arcuate connection and planar connecting without finishing.

Figure 1:
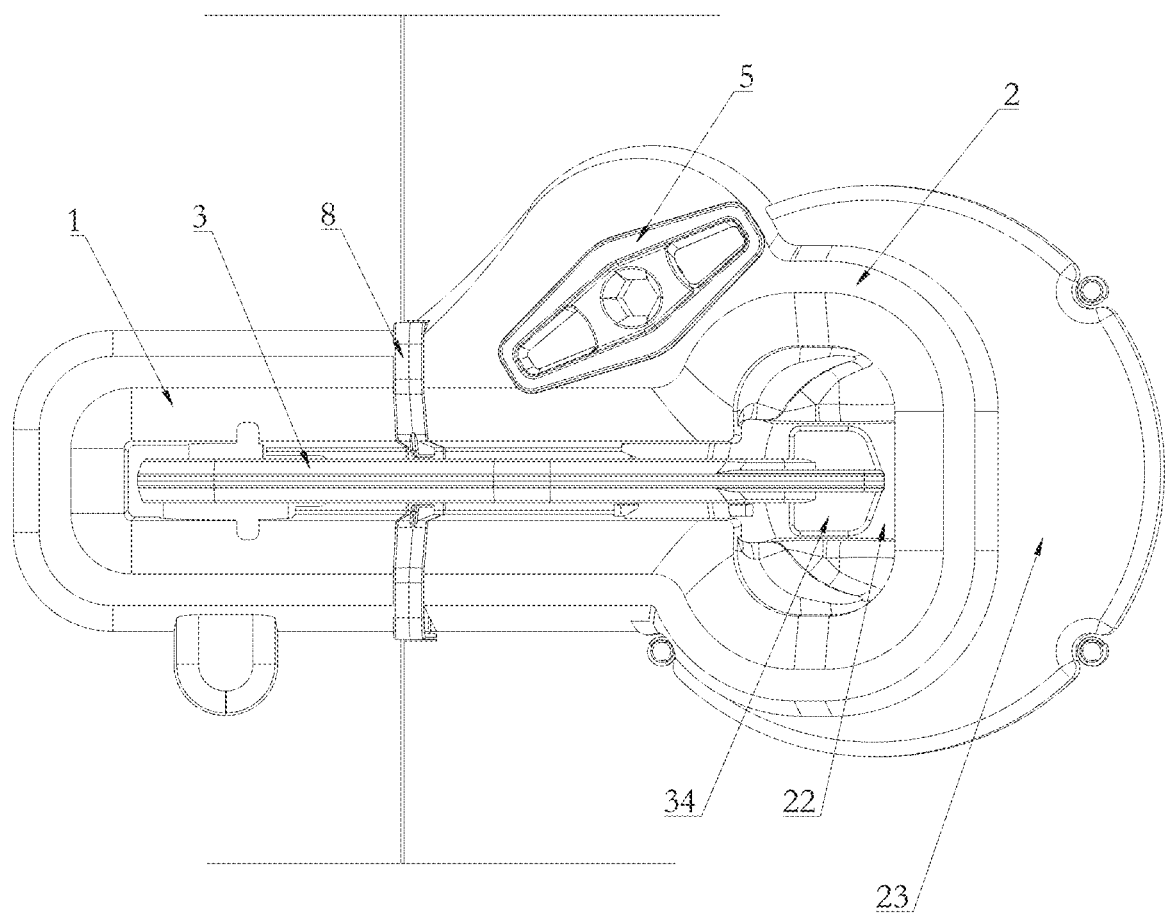
FIG. 1 is a schematic view showing a lock in a closed state in accordance with an implementation of the present invention.

REFERENCE NUMERALS 1 first base; 11 first groove; 12 pin hole; 13 first positioning bead; 2 second base; 21 second groove; 22 third groove; 23 oblique pin ring gear groove; 24 positioning hole; 25 second positioning bead; 3 latch; 31 first slot; 32 latch rotating shaft; 33 first bead positioning groove; 34 latch protrusion; 35 latch gear; 4 oblique pin ring gear; 41 second bead positioning groove; 42 cavity; 5 rotating hand wheel; 51 hand wheel gear; 6 limit screw; 7 positioning pin rack; 8 sector block; 81 sector block central hole; 82 sector block protrusion.

DETAILED DESCRIPTION OF THE INVENTION

Various objects, features and advantages of the present disclosure will become more apparent from the following detailed description accompanied with the drawings and implementations.

The key of the present invention is that a tight locking between two objects with a relatively large distance can be achieved by the clipping of the oblique pin ring gear whose radial thickness changes continuously to the slot on the latch. The lock mechanism can realize inward or outward arcuate connection and planar connecting without finishing.

Hereinafter, the present invention will be described using connecting plates as a first main body and a second main body, for example. It should be appreciated that the lock can also be used for main body other than connecting plates, such as boxes, cabinets, doors, and the like.

Figure 2:
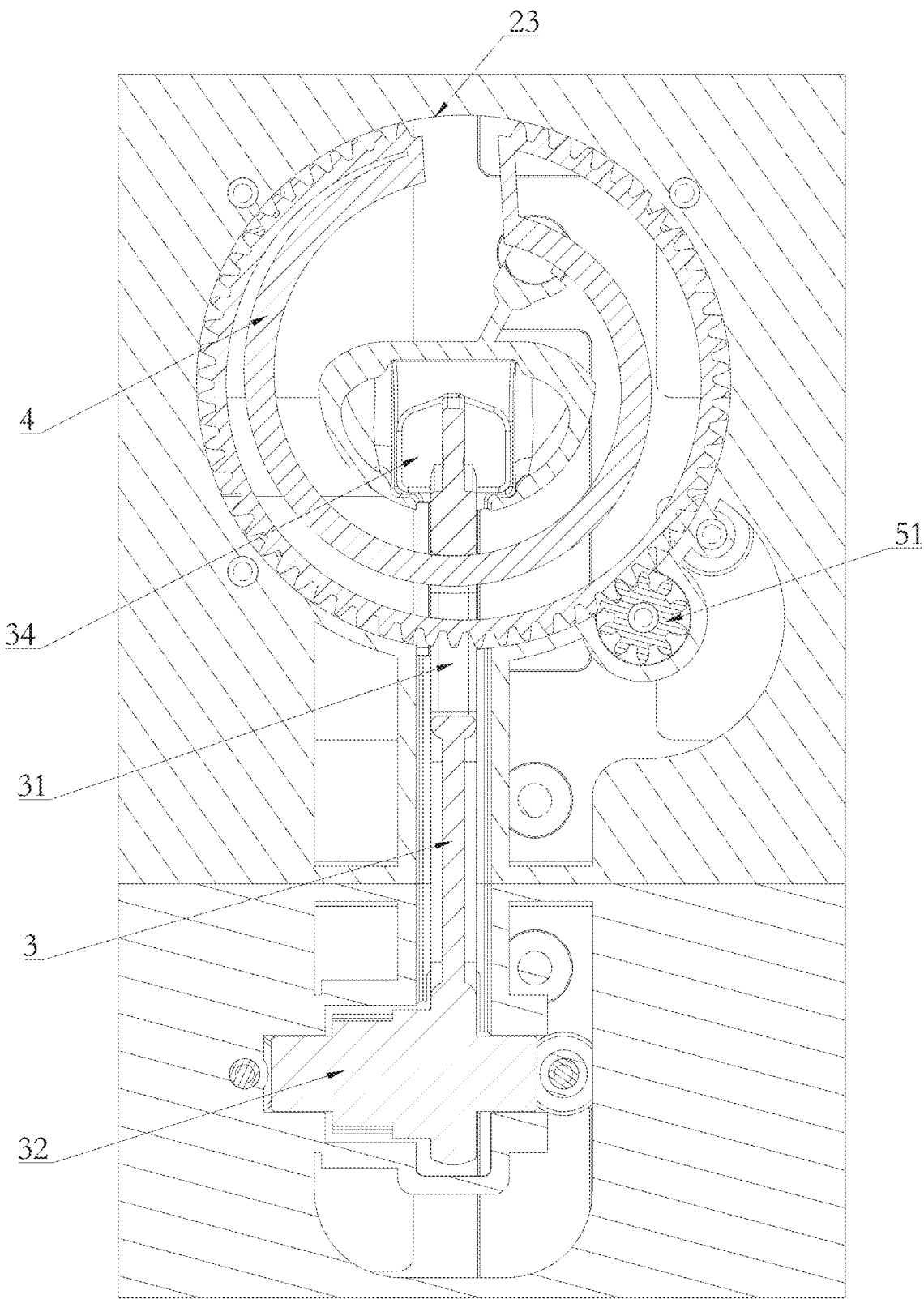
FIG. 2 is a cross-sectional view showing a lock in a closed state in accordance with an implementation of the present invention.
Figure 3:
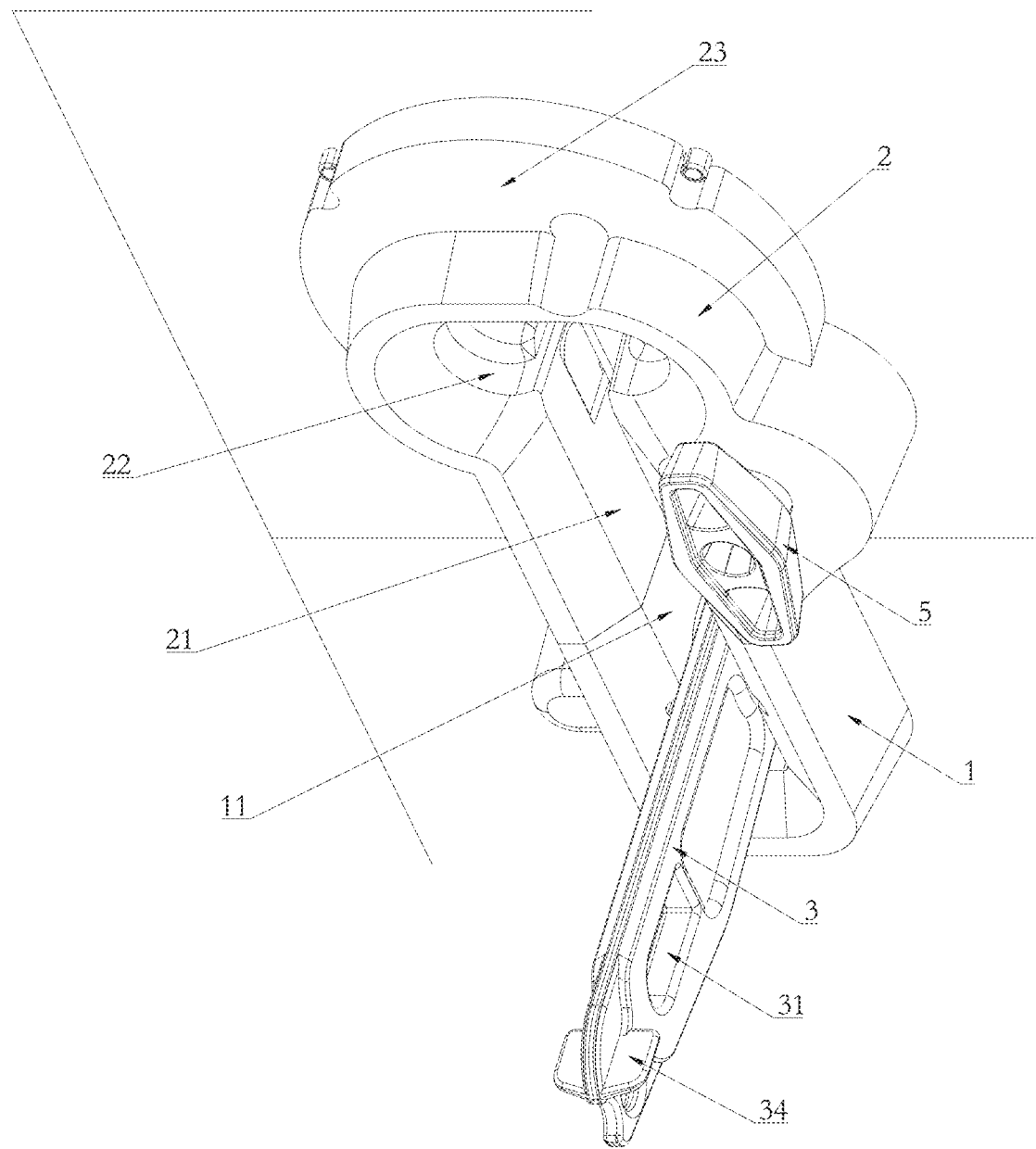
FIG. 3 is a schematic view showing a lock in an open state in accordance with an implementation of the present invention.
Figure 4:
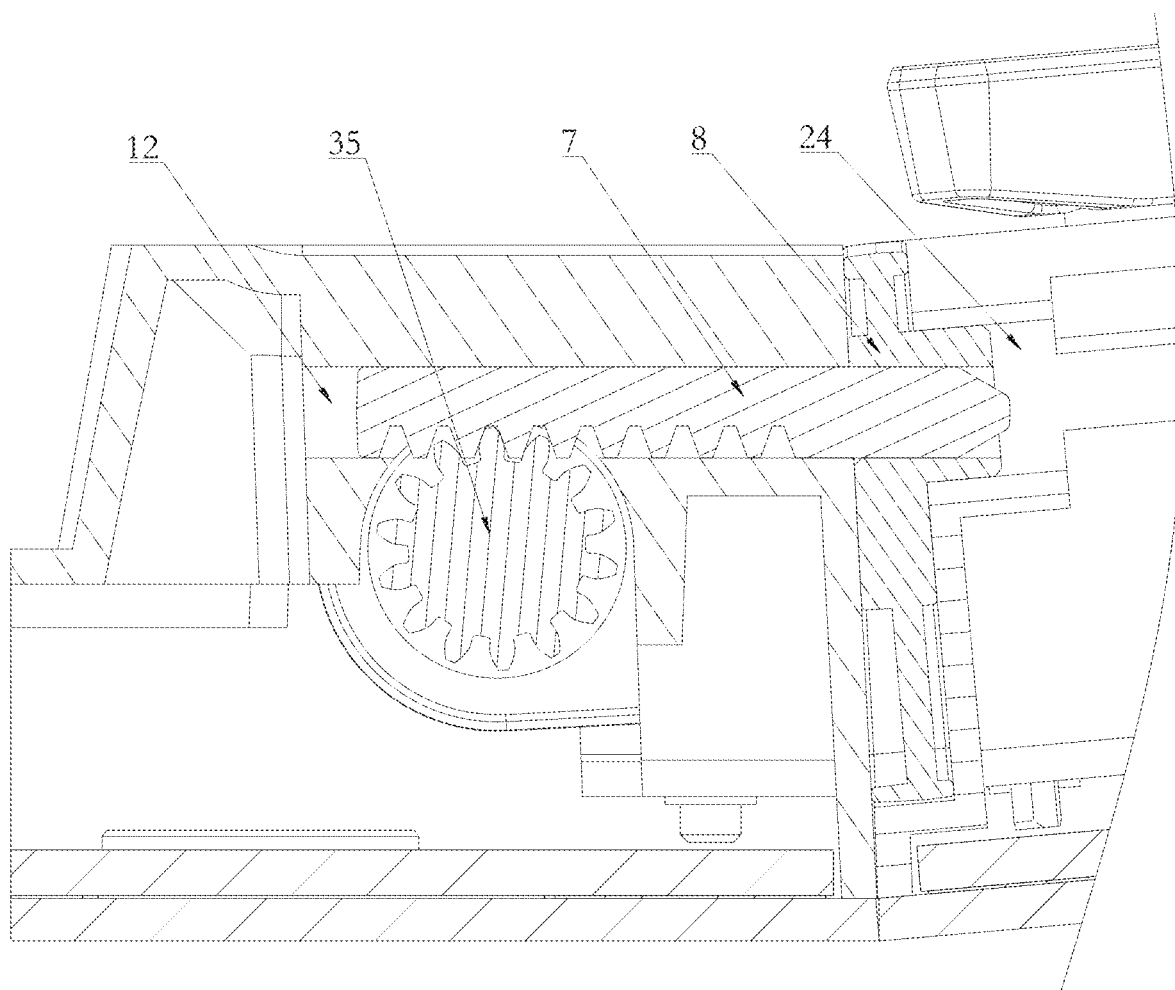
FIG. 4 is a cross-sectional view showing a positioning mechanism of the lock in accordance with an implementation of the present invention.
Figure 5:
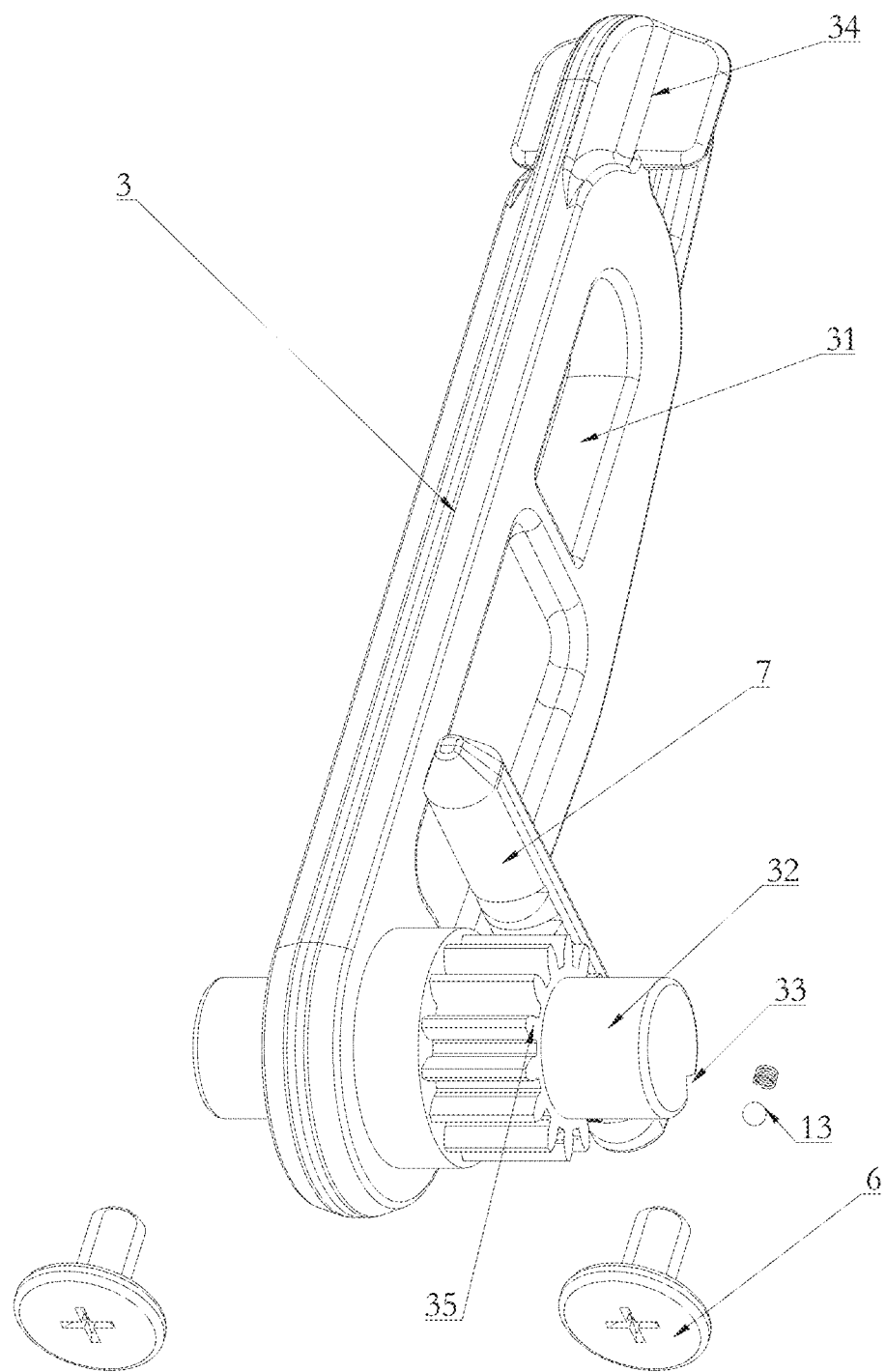
FIG. 5 is a schematic view showing the structure of a latch of the lock in accordance with an implementation of the present invention.
Figure 6:
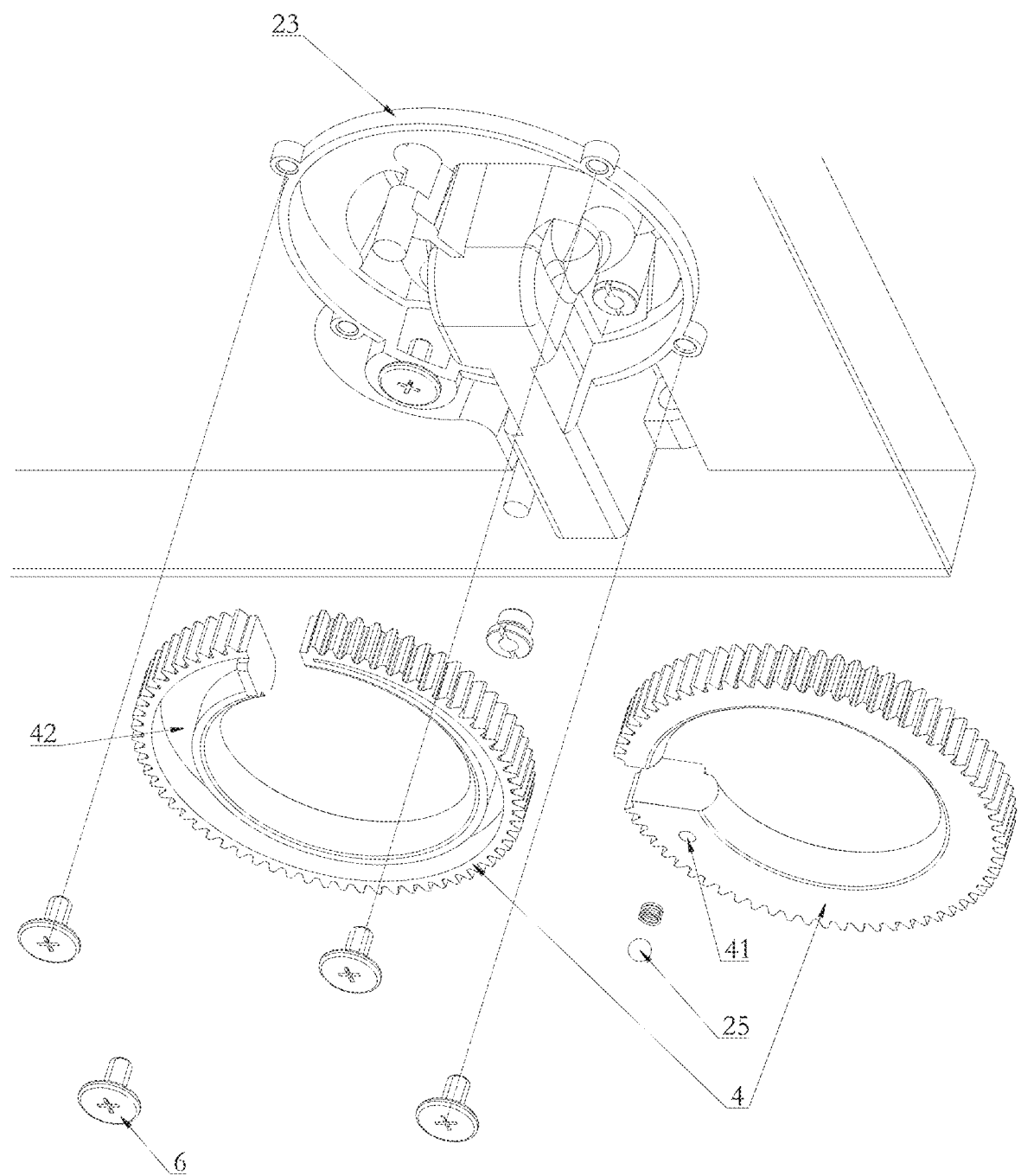
FIG. 6 is a schematic view showing the structure of a oblique pin ring gear of the lock in accordance with an implementation of the present invention, from two directions.
Figure 7:
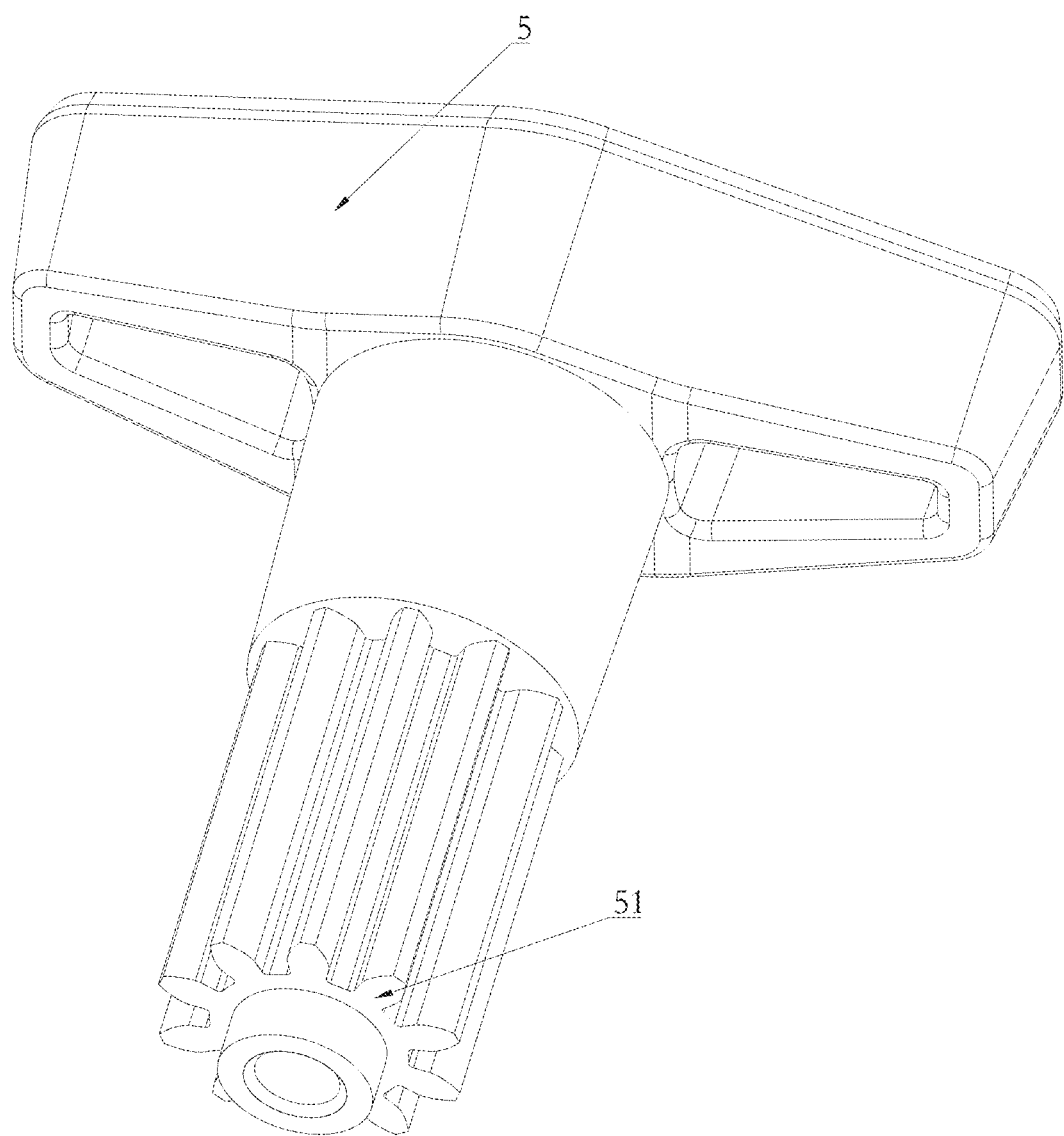
FIG. 7 is a schematic view showing the structure of a rotating hand wheel of the lock in accordance with an implementation of the present invention.
Figure 8:
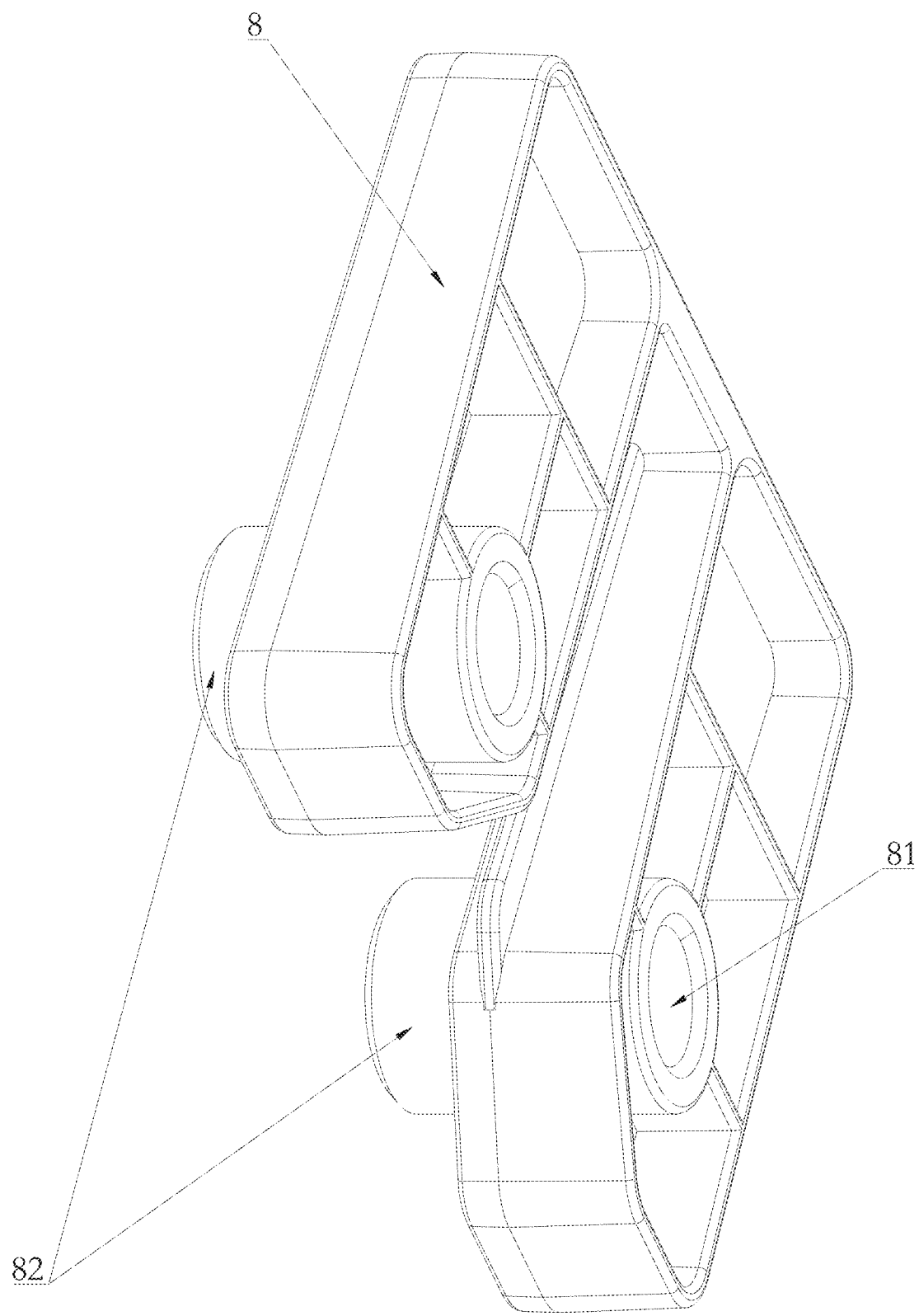
FIG. 8 is a schematic view showing the structure of a sector block of the lock in accordance with an implementation of the present invention.
Figure 9:
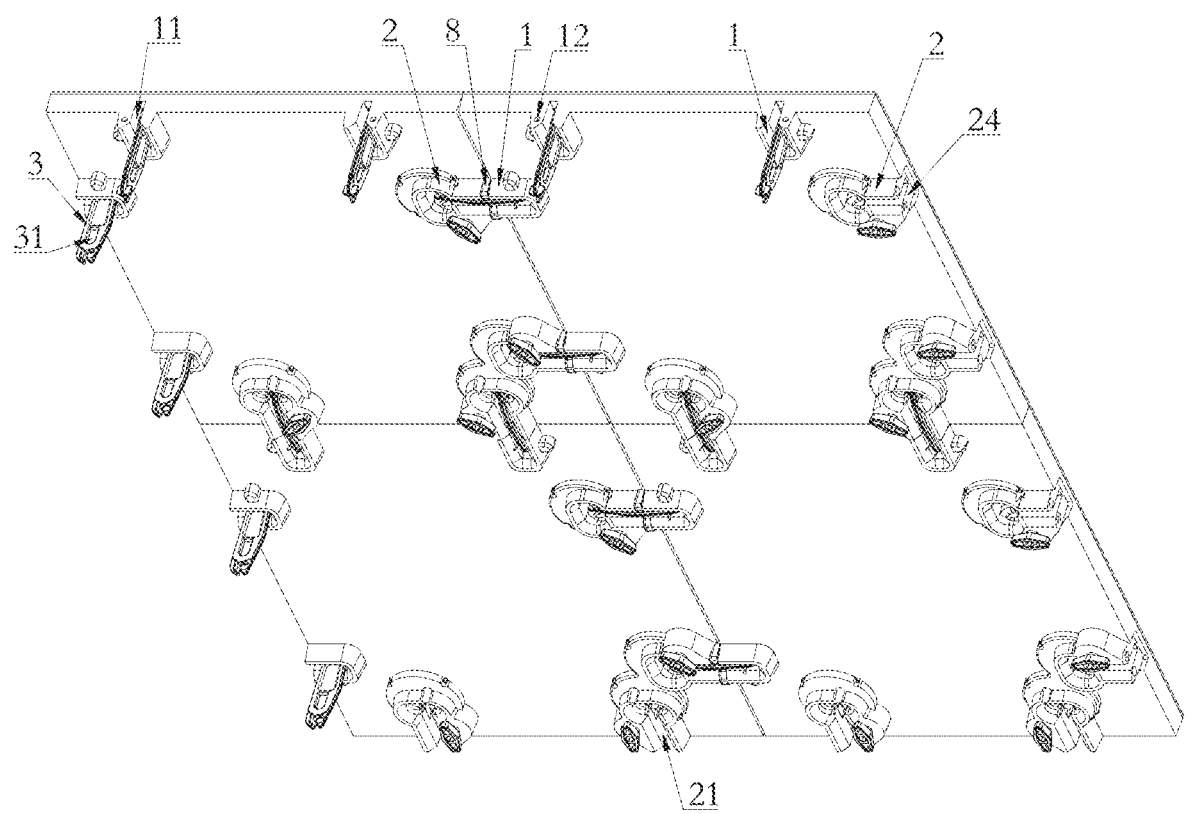
FIG. 9 is a schematic view showing the locks in accordance with an implementation of the present invention connect objects into one piece.

Referring to FIGS. 1 to 9, the present invention provides a lock for connecting plate, comprising a locking module and a driving module, wherein the locking module comprises a latch 3 mounted on a first connecting plate, a oblique pin ring gear 4 mounted on a second connecting plate and adapted to the latch 3; the radial thickness of the oblique pin ring gear 4 changes continuously; a first slot 31 is arranged on the latch 3, and wherein the driving module is used for driving the oblique pin ring gear 4 to move in a circular motion, such that on the latch 3 in a closed position the oblique pin ring gear 4 clips to or separates from the first slot 31.

As can be seen from the above description, the invention has the beneficial effects that the oblique pin ring gear inserts into the slot on the latch under the driving of the driving module to lock the first connecting plate and the second connecting plate. Since the radial thickness of the oblique pin ring gear changes continuously, the engagement occurs at a portion where the radial thickness of the oblique pin ring gear is relatively small when the distance deviation between the first connecting plate and the second connecting plate is relatively large; the engagement occurs at a portion where the radial thickness of the oblique pin ring gear is relatively large when the distance deviation between the first connecting plate and the second connecting plate is relatively small. Thus, in the case that the distance deviation between the first connecting plate and the second connecting plate is in a relatively wide range, the lock mechanism is able to secure two connecting plates well.

Further, the oblique pin ring gear 4 includes an outer contour and an inner contour; the outer contour is circular and is provided with sawteeth, and the inner contour is in an involute shape; the oblique pin ring gear is provided with a gap between the ends of the involute, through which the latch separates from the oblique pin ring gear.

As can be seen from the above description, the oblique pin is of an annular structure, so that it moves in a circular motion and save the occupied space of the lock. The circular outer contour of the oblique pin ring gear and the inner contour in an involute shape make the radial thickness of the oblique pin ring gear continuously change. In addition, once the radius of the base circle is determined, the involute shape is also uniquely determined, which is convenient for manufacturing and processing. When the gap on the oblique pin ring gear is turned away from the latch in a closed position, the first connecting plate and the second connecting plate are locked. When the gap is turned to the latch in a closed position, the connecting plates can be unlocked by pulling up the latch and separating the latch from the oblique pin ring gear.

Further, a sidewall of the first slot 31 corresponding to the inner contour of the oblique pin ring gear 4 is arcuate, and has an arc radius greater than the maximum radius of the involute of the inner contour.

As can be seen from the above description, the sidewall of the first slot corresponding to the inner contour of the oblique pin ring gear is arcuate, facilitating the first slot to match with the inner contour of the oblique pin ring gear. Further, the arc radius of the sidewall is greater than the maximum radius of the involute of the inner contour of the oblique pin ring gear. Thus, the force between the latch and the oblique pin ring gear will be scattered to the ends of the latch slot instead of concentrating at the center, no matter where the latch and the oblique pin ring gear are locked. The scattered force at the ends will produce a clockwise moment and a counterclockwise moment. The clockwise and counterclockwise moments are opposite in direction and are partially offset, reducing the resultant moment. Therefore, the value of the tangential decomposed force of the resultant moment is smaller than the value of the maximum static frictional force between the surface of the latch slot and the inner contour of the oblique pin ring gear. The latch slot and the inner contour of the gear ring will not slide against each other, so that the oblique pin ring gear can be reliably locked.

Further, the latch 3 is mounted on the first base 1 on the first connecting plate, and the oblique pin ring gear 4 is mounted on the second base 2 on the second connecting plate. The first base 1 and the second base 2 are provided with a first groove 11 and a second groove 21, respectively, for receiving the latch.

As can be seen from the above description, the latch is inserted into the grooves on the first base and the second base to lock the two connecting objects to move in a direction perpendicular to the connection direction.

Further, the driving module comprises a rotating hand wheel 5 provided with a hand wheel gear 51 on the shaft. The rotating hand wheel 5 is mounted on the second base 2 and the hand wheel gear 51 engages with the oblique pin ring gear 4.

As can be seen from the above description, the rotation of the rotating hand wheel will rotate the hand wheel gear, thus driving the oblique pin ring gear to move in a circular motion. The way of driving by means of a gear or a rack provides a long service life, stable operation and high reliability. Moreover, the rotating hand wheel does not need to move as the oblique pin ring gear moves, which greatly saves space.

Further, the latch 3 is provided with a latch rotating shaft 32 at the bottom, and the latch rotating shaft 32 is mounted on the first base 1 through a limit screw 6, so that the latch 3 rotates around the first base 1.

Further, the latch rotating shaft 32 is provided with a first bead positioning groove 33, and the first base 1 is provided with a first positioning bead 13 matched with the first bead positioning groove 33.

As can be seen from the above description, when the latch is turned to a vertical position, the positioning bead is inserted into the first bead positioning groove to achieve the upright positioning of the latch.

Further, the latch 3 is provided with a latch protrusion 34 at the top, and the second base 2 is provided with a third groove 22 adapted to the latch protrusion 34.

As can be seen from the above description, in the case that the latch is closed, the lock mechanism can withstand the self-weight of the connecting objects and prevent them from slipping off.

Further, the oblique pin ring gear 4 is provided with a second bead positioning groove 41, and the second base 2 is provided with a second positioning bead 25 matched with the second bead positioning groove 41.

As can be seen from the above description, when the oblique pin ring gear does not clip to the latch slot, the positioning bead is inserted into the second bead positioning groove on the oblique pin ring gear to achieve the positioning of the initial position of the oblique pin ring gear.

Further, the oblique pin ring gear is provided with a cavity 42 having a contour shape similar to that of the oblique pin ring gear.

As can be seen from the above description, the provision of the cavity on the oblique pin ring gear will reduce the weight of the oblique pin ring gear. On the other hand, the material is saved and the cost is reduced.

Further, the oblique pin ring gear 4 is mounted in a matching oblique pin ring gear groove 23 by a limit screw 6, and the oblique pin ring gear groove 23 is fixed on the second base 2.

Further, the oblique pin ring gear groove 23 is a cylindrical groove, whose undersurface circle has a radius slightly larger than the radius of the outer contour circle of the oblique pin ring gear.

As can be seen from the above description, after the oblique pin ring gear is mounted, the oblique pin ring gear moves in a circular motion in the cylindrical groove under the driving of the driving module. The cylindrical groove is used for limiting the movement track of the oblique pin ring gear, which makes the movement of the oblique pin ring gear more stable. Optionally, the cylindrical groove is provided with a cover plate to constitute a space with the cylindrical groove for accommodating the oblique pin ring gear, and to prevent the oblique pin ring gear from falling off the cylindrical groove.

Further, the lock further comprises a sector block 8 for being disposed between the first base 1 and the second base 2, and the sector block 8 has a central angle in the direction perpendicular to the connecting surface of the first connecting plate and the second connecting plate.

Further, the central angle is in a range of 0-40 degrees.

It can be seen from the above description that inward or outward arcuate connection and planar connection can be achieved by selecting connecting blocks having different central angles.

Further, the lock further comprises a positioning mechanism comprising a positioning pin rack 7 and a positioning hole 24 that match each other, wherein the positioning pin rack 7 is mounted in a pin hole 12 of the first base 1 and engages with the latch 3 through a latch gear 35 arranged on the latch rotating shaft 32, and wherein the positioning hole 24 is fixed on the second base 2, and the positioning pin rack 7 moves under the driving of the latch gear 35 to insert into or withdraw from the positioning hole 24.

As can be seen from the above description, after the latch is closed around the rotating center thereof, the positioning pin rack is inserted into the positioning hole on the second base under the driving of the latch gear to achieve the positioning. The positioning pin structure using the rack to drive makes the positioning mechanism small, and provides a stable, reliable and flexible operation.

Further, the positioning mechanism further includes a sector block 8 for being disposed between the first base 1 and the second base 2, and the sector block 8 has a central angle ranging from 0 to 40 degrees in the direction perpendicular to the connecting surface of the first connecting plate and the second connecting plate. The positioning pin rack 7 is inserted into the sector block 8 in advance of the positioning hole 24.

Further, the sector block 8 has a sector central hole 81, through which the positioning pin rack 7 passes, and has a sector protrusion 82 inserted into the positioning hole 24.

As can be seen from the above description, the addition of the sector block having a central angle into the positioning mechanism may provide a more stable and reliable positioning in an arcuate connection, and the lock may firmly secure the two connecting plates.

Example 1 in accordance with the present invention is as follows.

A lock for connecting plate, comprising a locking module and a driving module, wherein the locking module comprises a latch 3 mounted on a first connecting plate, a oblique pin ring gear 4 mounted on a second connecting plate and adapted to the latch 3; the radial thickness of the oblique pin ring gear 4 changes continuously; a first slot 31 is arranged on the latch 3, and wherein the driving module is used for driving the oblique pin ring gear 4 to move in a circular motion, such that on the latch 3 in a closed position the oblique pin ring gear 4 clips to or separates from the first slot 31.

The latch 3 is mounted on the first base 1 on the first connecting plate, and the oblique pin ring gear 4 is mounted on the second base 2 on the second connecting plate. The first base 1 and the second base 2 are provided with a first groove 11 and a second groove 21, respectively, for receiving the latch.

The latch 3 is provided with a latch rotating shaft 32 at the bottom, and the latch rotating shaft 32 is mounted on the first base 1 through a limit screw 6, so that the latch 3 rotates around the first base 1.

The oblique pin ring gear 4 is mounted in a matching oblique pin ring gear groove 23 by a limit screw 6, and the oblique pin ring gear groove 23 is fixed on the second base 2.

The oblique pin ring gear groove 23 is a cylindrical groove, whose undersurface circle has a radius slightly larger than the radius of the outer contour circle of the oblique pin ring gear.

Example 2 in accordance with the present invention is as follows.

The Example 2 differs from the Example 1 in that the oblique pin ring gear 4 includes an outer contour and an inner contour; the outer contour is circular and is provided with sawteeth, and the inner contour is in an involute shape; the oblique pin ring gear is provided with a gap between the ends of the involute, through which the latch separates from the oblique pin ring gear. A sidewall of the first slot 31 corresponding to the inner contour of the oblique pin ring gear 4 is arcuate, and has an arc radius greater than the maximum radius of the involute of the inner contour.

Example 3 in accordance with the present invention is as follows.

The Example 3 differs from the Example 2 in that the driving module comprises a rotating hand wheel 5 provided with a hand wheel gear 51 on the shaft. The rotating hand wheel 5 is mounted on the second base 2 and the hand wheel gear 51 engages with the oblique pin ring gear 4.

Example 4 in accordance with the present invention is as follows.

The Example 4 differs from the Example 3 in that the latch rotating shaft 32 is provided with a first bead positioning groove 33, and that the first base 1 is provided with a first positioning bead 13 matched with the first bead positioning groove 33.

Example 5 in accordance with the present invention is as follows.

The Example 5 differs from the Example 4 in that the latch 3 is provided with a latch protrusion 34 at the top, and the second base 2 is provided with a third groove 22 adapted to the latch protrusion 34.

Example 6 in accordance with the present invention is as follows.

The Example 6 differs from the Example 5 in that the oblique pin ring gear 4 is provided with a second bead positioning groove 41, and the second base 2 is provided with a second positioning bead 25 matched with the second bead positioning groove 41.

Example 7 in accordance with the present invention is as follows.

The Example 7 differs from the Example 6 in that the oblique pin ring gear is provided with a cavity 42 having a contour shape similar to that of the oblique pin ring gear.

Example 8 in accordance with the present invention is as follows.

The Example 8 differs from the Example 7 in that the lock further comprises a sector block 8 for being disposed between the first base 1 and the second base 2, and the sector block 8 has a central angle in the direction perpendicular to the connecting surface of the first connecting plate and the second connecting plate. The central angle is in a range of 0-40 degrees.

Example 9 in accordance with the present invention is as follows.

The Example 9 differs from the Example 7 in that the lock further comprises a positioning mechanism comprising a positioning pin rack 7 and a positioning hole 24 that match each other, wherein the positioning pin rack 7 is mounted in a pin hole 12 of the first base 1 and engages with the latch 3 through a latch gear 35 arranged on the latch rotating shaft 32, and wherein the positioning hole 24 is fixed on the second base 2, and the positioning pin rack 7 moves under the driving of the latch gear 35 to insert into or withdraw from the positioning hole 24.

Example 10 in accordance with the present invention is as follows.

The Example 10 differs from the Example 9 in that the positioning mechanism further includes a sector block 8 for being disposed between the first base 1 and the second base 2, and the sector block 8 has a central angle ranging from 0 to 40 degrees in the direction perpendicular to the connecting surface of the first connecting plate and the second connecting plate. The positioning pin rack 7 is inserted into the sector block 8 in advance of the positioning hole 24. The sector block 8 has a sector central hole 81, through which the positioning pin rack 7 passes, and has a sector protrusion 82 inserted into the positioning hole 24.

In summary, the present invention provides a lock for connecting plate, in which the oblique pin ring gear is inserted into the slot having an arcuate sidewall on the latch, thus tightly locking the first base and the second base. The arcuate sidewall is used for scattering the interactive force between the latch and the oblique pin ring gear, providing a stable locking to the oblique pin ring gear. Since the radial thickness of the oblique pin ring gear changes continuously, the lock mechanism is capable of securing the two connecting plates when the distance deviation between the first connecting plate and the second connecting plate is in a relatively wide range. An inward or outward arcuate connection and planar connection can be achieved by selecting connecting blocks having different central angles. Moreover, the positioning pin structure using the rack to drive makes the positioning mechanism small, and provides a stable, reliable and flexible operation. The lock is capable of connecting heavier objects.

It should be noted that the above implementations are only used to explain the technical solutions of the present application, and are not limited thereto. Those skilled in the art should understand that the modifications or equivalent substitutions of the present application are not intended to be excluded from the scope of the invention.

What is claimed is:

1. A lock, comprising:
a locking module and a driving module,
wherein the locking module comprises a latch mounted on a first main body, an oblique pin ring gear mounted on a second main body and adapted to cooperate with the latch; a radial thickness of the oblique pin ring gear changes continuously; a first slot is arranged on the latch,
wherein the driving module is used for driving the oblique pin ring gear to move in a circular motion, such that on the latch in a closed position the oblique pin ring gear clips to or separates from the first slot,
wherein the latch is mounted on a first base on the first main body, and the oblique pin ring gear is mounted on a second base on the second main body; the first base and the second base are provided with a first groove and a second groove, respectively, for receiving the latch,
wherein the oblique pin ring gear is mounted in a matching oblique pin ring gear groove by a limit screw, and the oblique pin ring gear groove is fixed on the second base,
wherein the lock further comprises a positioning mechanism comprising a positioning pin rack and a positioning hole that match each other,
wherein the positioning pin rack is mounted in a pin hole of the first base and engages with the latch through a latch gear arranged on a latch rotating shaft, and
wherein the positioning hole is fixed on the second base, and the positioning pin rack moves under the driving of the latch gear to insert into or withdraw from the positioning hole.

2. The lock according to claim 1, wherein the oblique pin ring gear includes an outer contour and an inner contour; the outer contour is circular and is provided with saw teeth, and the inner contour is in an involute shape; the oblique pin ring gear is provided with a gap between the ends of the involute shape of the inner contour, through which the latch separates from the oblique pin ring gear.

3. The lock according to claim 2, wherein a sidewall of the first slot corresponding to the inner contour of the oblique pin ring gear is arcuate and has an arc radius greater than a maximum radius of the involute shape of the inner contour.

4. The lock according to claim 1, wherein the driving module comprises a rotating hand wheel provided with a hand wheel gear on a shaft thereof; the rotating hand wheel is mounted on the second base and the hand wheel gear engages with the oblique pin ring gear.

5. The lock according to claim 1, wherein the lock further comprises a sector block for being disposed between the first base and the second base, and the sector block has a central angle in a direction perpendicular to a connecting surface of the first main body and the second main body.

6. The lock according to claim 5, wherein the central angle is in a range of 0-40 degrees.

7. The lock according to claim 1, further comprising a sector block for being disposed between the first base and the second base, wherein the sector block has a central angle in the direction perpendicular to a connecting surface of the first main body and the second main body, and wherein the sector block has a sector central hole, through which the positioning pin rack passes, and has a sector protrusion inserted into the positioning hole.

* * * * *